US006840133B2

(12) United States Patent
Aubrey et al.

(10) Patent No.: US 6,840,133 B2
(45) Date of Patent: Jan. 11, 2005

(54) MECHANICAL OVERRIDE RELEASE MECHANISM FOR CABLE TENSIONING SYSTEMS

(75) Inventors: Michael Richard Aubrey, Gloucester (GB); Alan Samuel Botham, Worcestershire (GB); Roberto Capolongo, Worcester (GB); Neil Dean Williams, Worcestershire (GB)

(73) Assignee: Dura Global Technologies, Inc., Rochester Hills, MI (US)

(*) Notice: Subject to any disclaimer, the term of this patent is extended or adjusted under 35 U.S.C. 154(b) by 127 days.

(21) Appl. No.: 10/225,750

(22) Filed: Aug. 22, 2002

(65) Prior Publication Data

US 2003/0150289 A1 Aug. 14, 2003

(30) Foreign Application Priority Data

Feb. 13, 2002 (GB) .............................. 0203385

(51) Int. Cl.[7] .............................................. G05G 5/06
(52) U.S. Cl. ........................................ 74/531; 188/2 D
(58) Field of Search ........................... 74/501.5 R, 527, 74/529, 531; 188/2 D; 403/321, 322.1, 322.3

(56) References Cited

U.S. PATENT DOCUMENTS

| 3,729,070 | A | * | 4/1973 | Le Marchand | 188/170 |
| 5,590,744 | A | * | 1/1997 | Belmond | 188/265 |
| 6,386,338 | B1 | * | 5/2002 | Powrozek | 188/156 |
| 6,533,082 | B2 | * | 3/2003 | Gill et al. | 188/156 |
| 6,609,595 | B2 | * | 8/2003 | Flynn et al. | 188/156 |

* cited by examiner

Primary Examiner—David Bucci
Assistant Examiner—Timothy McAnulty
(74) Attorney, Agent, or Firm—Richard M. Mescher; Porter Wright; Dean B. Watson (57) ABSTRACT

The release mechanism includes a hollow abutment member fastened to one end of the flexible outer conduit of the cable. The abutment member is mounted for sliding movement in a housing, but is normally prevented from sliding by a stop member associated with the housing for engaging a shoulder on the abutment member. The stop member establishes a reaction surface against which the abutment member and outer conduit bear when the cable is tensioned. An actuating mechanism is provided to selectively move the stop member so that the stop member is out of engagement with the shoulder of the abutment member, for example by a rotary movement, to permit axial movement of the abutment member in the housing when it is desired to release tension in the cable.

17 Claims, 6 Drawing Sheets

MECHANICAL OVERRIDE RELEASE MECHANISM FOR CABLE TENSIONING SYSTEMS

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

This invention relates to override release mechanisms for cable tensioning systems such as electrically actuated cable brake mechanisms of automobiles. A typical electrically actuated cable brake mechanism would be a mechanism for actuating a parking brake either automatically whenever the engine stops (in which case the conventional hand or foot-operated parking brake lever of the vehicle becomes redundant and may be omitted from the vehicle design) or as a parking brake override mechanism in the event the parking brake is not properly applied and vehicle movement is sensed. Other cable tensioning systems can be found in a variety of control systems, mainly but not extensively in the field of transport where the cable tensioning systems are often used for brake actuation.

BACKGROUND OF THE INVENTION

A (non-limiting) example of a cable tensioning system with which the override release mechanism of the invention can be used is a known electrically actuated cable brake mechanism which comprises a cable tensioning drive nut threaded onto a lead screw. A motor rotates the lead screw on instructions from an electronic control unit (ECU) to cause tensioning of a brake cable when it is desired to actuate the brake. The reaction force to cable movement is established through a flexible outer conduit for the cable.

Other malfunctions that might prevent the intended brake release would be a loss of power from the vehicle battery, an electrical fault in the ECU, a fault in the wiring connecting the ECU to the motor driving the lead screw, failure in the motor itself, damage to the bearings mounting the lead screw, or damage to one or more of the gears between the driving motor and the lead screw. If any of the above faults takes place while the brakes are engaged, then in the absence of an override release mechanism, the vehicle is immobilized and cannot even be towed to a garage for repair.

It has been proposed to provide a flexible drive shaft from a manual control wheel to a shaft of the electric motor driving the electrically activated cable brake mechanism, so that in the event of motor failure, the lead screw can be rotated manually through the drive shaft so as to release the tension in the cable brake, permitting the vehicle to be towed to a repair garage. That is, however, only a partial solution to the problem because if the drive nut is cross-threaded on the lead screw, or if the brake malfunction is due to a fault in the gear box or a bearing fault and the electrically actuated cable brake mechanism becomes seized solid in the brake-applied condition, then no manual hand wheel will permit the lead screw to be rotated so as to release the cable tension.

It is an object of this invention to provide an override release mechanism which can rapidly and reliably release the tension in the cable, irrespective of whether the malfunction in the electrically actuated cable tensioning mechanism is an electrical malfunction that results in a total seizure of the cable tensioning mechanism.

SUMMARY OF THE INVENTION

The invention provides an override mechanism for a cable tensioning mechanism in which a cable is tensioned by a motor against the reaction thrust of a flexible outer conduit for the cable, the release mechanism comprising: a hollow abutment member fastened to one end of the flexible outer conduit of the cable, the cable passing through the hollow center of the abutment member for connection to a motor-actuated tensioning drive nut; a housing in which the abutment member can slide axially; a stop member associated with the housing for engaging with a shoulder on the abutment member for arresting the sliding movement of the abutment member in the housing and establishing a reaction surface against which the abutment member and outer conduit bear when the cable is tensioned; and means for selectively moving the stop member out of engagement with the shoulder of the abutment member to permit axial movement of the abutment member in the housing when it is desired to release the tension in the cable In normal use, when the override release mechanism is not actuated, the cable tensioning mechanism can apply and release the tension in the cable by moving the tensioning drive nut axially of a lead screw. The lead screw is conventionally driven from an electric motor acting through a reduction gearbox, and as the drive nut moves one axial end of the cable in a cable tensioning direction, so the hollow abutment fastened to that end of the flexible outer conduit of the cable is in abutment with the stop member so as to provide the necessary reaction force to establish the operative tension in the cable. According to the invention if the cable tension is locked ON for any reason and it is desired to actuate the override release mechanism, then the stop member is simply moved out of engagement with the shoulder of the abutment member to permit axial movement of the abutment member in the housing. The reaction force to the tension in the cable is therefore released, which releases the cable tension and thus releases the vehicle parking brake or the other mechanical device engaged by the cable tension.

Preferably the movement necessary to take the stop member out of engagement with the shoulder of the abutment member is a rotary sliding movement of the stop member, but equally the override mechanism can be designed so that the necessary movement of the stop member is a linear sliding movement. The important consideration is that when the stop member is in its operating position, it should engage the shoulder of the abutment member so as to establish the reaction force to the tensioning of the cable. When it is moved out of engagement, the abutment member is permitted to move axially relative to the housing in a tensioning-releasing direction.

In the case where the movement to take the stop member out of engagement with the shoulder of the abutment member is a rotary sliding movement, the abutment member preferably comprises at least a portion which is non-cylindrical in shape, the shoulder on the abutment member being defined by an axial end of the portion. The stop member comprises a sleeve within the housing. The sleeve has a non-cylindrical channel therein of a size and shape complementary to the size and shape of the non-cylindrical portion of the abutment member. The means for selectively moving the stop member comprises means for rotating the sleeve from an angular condition in which the shapes of the non-cylindrical portion of the abutment member and the non-cylindrical channel are out of alignment and the abutment member is thus prevented from entering the channel, to an angular condition in which the shapes are in alignment and the abutment member can enter the channel to relieve the tension in the cable. The abutment member preferably further comprises a cylindrical guide portion of a diameter less than the maximum width of the non-cylindrical portion of the abutment member. The shoulder on the abutment member is thus defined by the junction between the non-cylindrical portion and the cylindrical guide portion of the abutment member. In such an arrangement he housing itself preferably includes a guide portion cooperating with the non-cylindrical portion of the abutment member to prevent angular rotation thereof.

For example, when the non-cylindrical portion of the abutment member is hexagonal in shape, the end wall of that non-cylindrical portion comprises six angularly spaced shoulders which in one angular configuration of the stop member engage an end face of the stop member, preventing axial movement of the abutment member in the housing. When the stop member is rotated to bring the hexagonal shapes of the non-cylindrical portion of the abutment member and the non-cylindrical channel in the sleeve into angular alignment, then the abutment member enters the channel, moving axially of the housing so as to relieve the tension in the cable.

The means for moving the stop member out of engagement with the shoulder of the abutment member may be a two-way electric motor or a lever or cable actuating mechanism. If a cable actuating mechanism is used, then it should act against the bias of a return spring so that the after the jammed or faulty cable tensioning mechanism has been repaired, the override release mechanism automatically resets as soon as the abutment member is moved past the stop member into a fully-brake-released condition.

BRIEF DESCRIPTION OF THE DRAWINGS

These and further features of the present invention will be apparent with reference to the following description and drawings, wherein.

It should be understood that the appended drawings are not necessarily to scale, presenting a somewhat simplified representation of various preferred features illustrative of the basic principles of the invention. The specific design features of an override release mechanism as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the override release mechanism illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the override release mechanism disclosed herein. The following detailed discussion of various alternative and preferred embodiments will illustrate the general principles of the invention with reference to an electrically actuated cable brake mechanism for the parking brake of an automobile. Other embodiments suitable for other applications will be apparent to those skilled in the art given the benefit of this disclosure.

Figure 1:
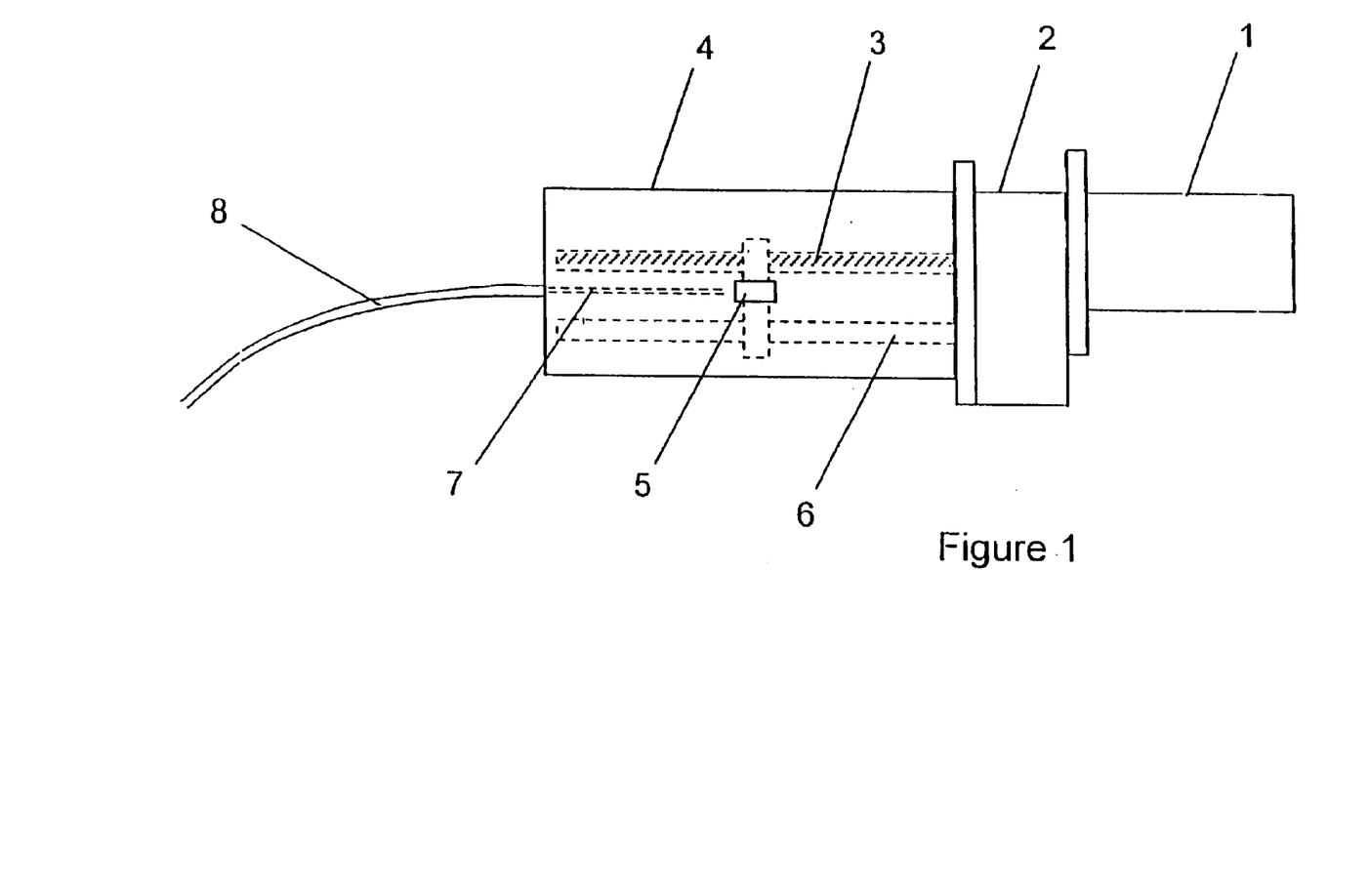
FIG. 1 is a side view of an electrically actuated cable brake mechanism for the parking brake of an automobile, illustrated only schematically.

FIG. 1 illustrates schematically the arrangement of a conventional electrically actuated cable brake mechanism. The mechanism comprises an electric motor 1, a gear-box 2 and a lead screw 3. The motor 1, controlled by an ECU 24, drives the lead screw 3 through the gear-box 2.

The housing 4 surrounds the lead screw 3. Threaded onto the lead screw 3 is a cable tensioning drive nut 5 which also slides on a smooth guide shaft 6 parallel to the lead screw 3, for preventing rotation of the drive nut 5 around the axis of the lead screw and for ensuring even loading and smooth sliding action of the nut.

An inner cable 7 of a sheathed actuating cable is connected to the tensioning drive nut, and an outer conduit 8 of the brake cable is connected to the housing 4. When the tensioning drive nut 5 is moved to the right as viewed in FIG. 1, the inner cable 7 is pulled to the right and the outer conduit 8, held by the housing 4, presents a reaction force for brake actuation.

Figure 2:
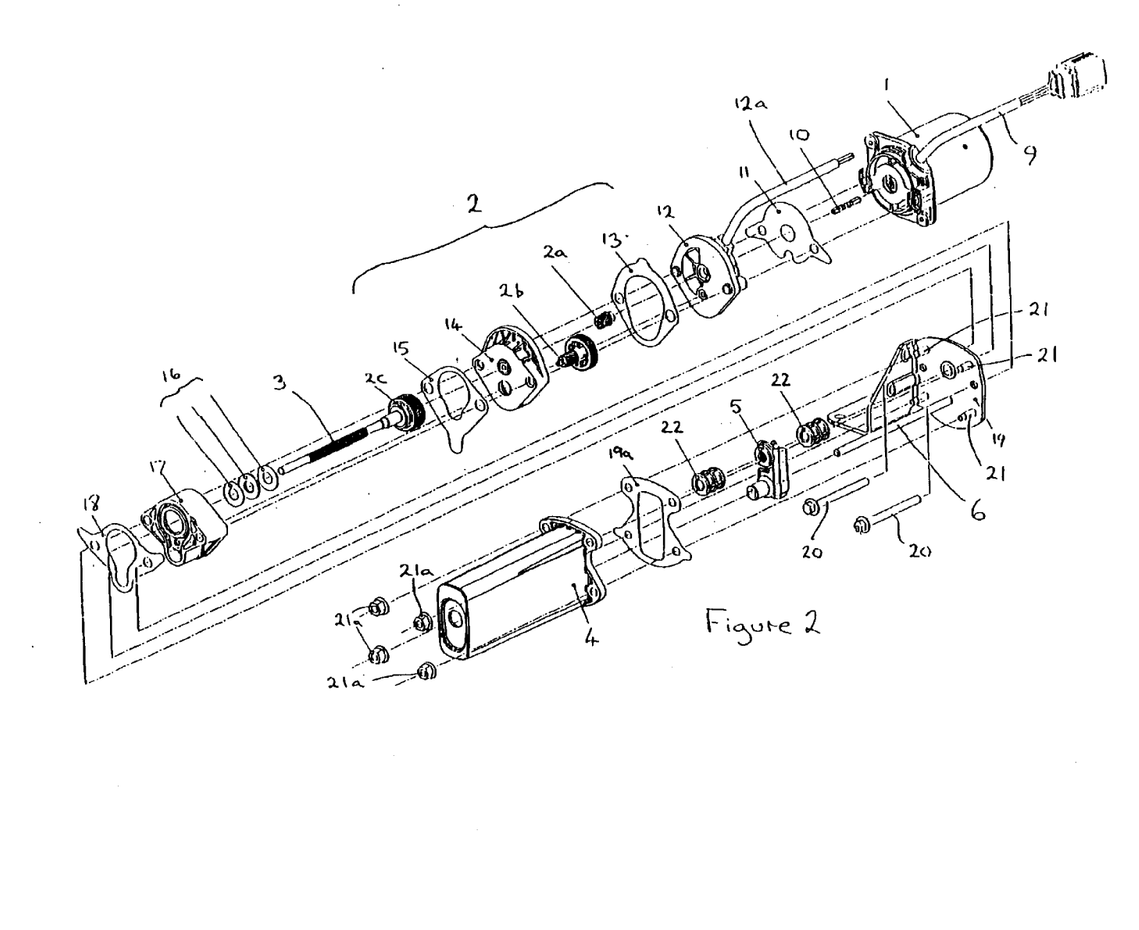
FIG. 2 is an exploded view of the components of the electrically actuated cable brake mechanism of FIG. 1.

Although not illustrated in the drawings, it is possible for a single brake actuating cable to operate both left and right hand wheel brakes of the vehicle by joining the inner cable 7 and outer conduit 8 to a known reaction system which uses action and reaction to generate equal braking forces on the left and right wheel brakes FIG. 2 shows the components necessary to build an electrically actuated cable brake mechanism according to FIG. 1, but exploded in format. A power cable 9 drives the electric motor 1 under the control of an ECU 24 (Figure), a drive shaft 10 links the motor to the elements 2a, 2b and 2c of the gear-box 2. Also illustrated in FIG. 2 are a gasket 11, an end cap 12 for the gear-box incorporating a Hall effect sensor for detecting rotation of an intermediate gear 2b of the gear-box, and a feedback wire 12a for relaying back to the ECU 24 information relating to the precise position of the tensioning nut 5 on the lead screw shaft 3. FIG. 2 also shows a gasket 13, a gear-box cover 14, a gasket 15, a thrust bearing assembly 16 comprising two thrust bearing plates separated by a ball thrust bearing, and a gear-box end cap housing 17. A gasket 18 is provided between the gear-box assembly 2 and a mounting bracket 19. Bolts 20 connect together the gear-box 2 and the motor 1. Four shorter bolts 21 and associated nuts 21a connect each screw housing 4 to the mounting bracket 19 with an intermediate gasket 19a.

Buffers 22 are provided one on each side of the tensioning drive nut 5, to cause re-engagement of the drive nut 5 on the lead screw 3 if it over-runs from either end of the lead screw under a no-load condition.

Figure 3:
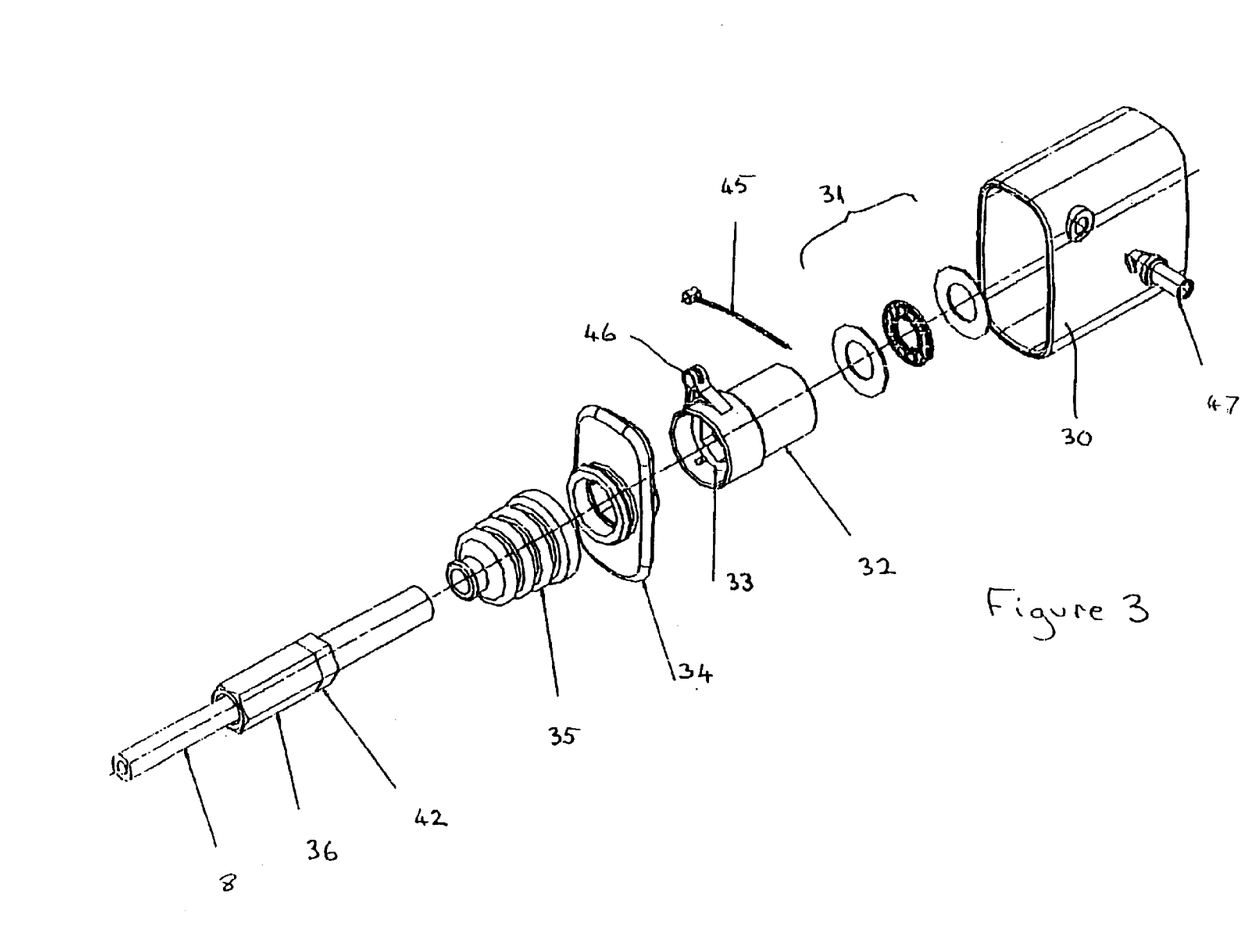
FIG. 3 is an exploded view of the components of an override release mechanism according to the present invention, for use with the cable brake mechanism of FIGS. 1 and 2.
Figure 4:
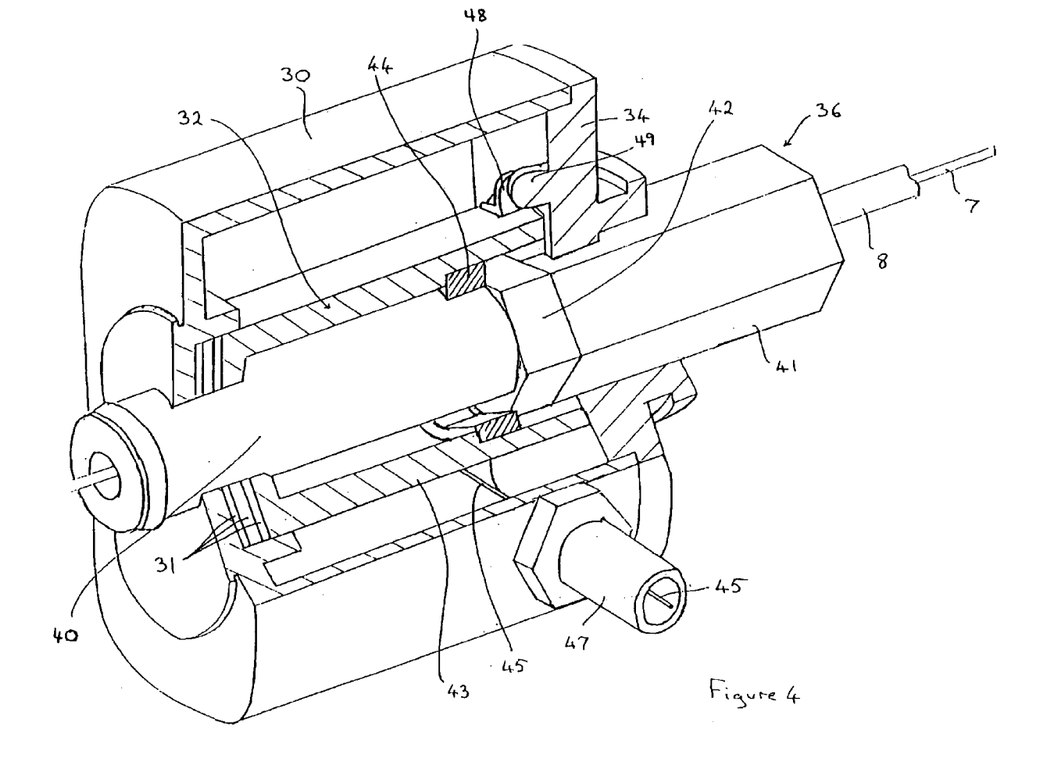
FIG. 4 is a perspective view of the assembled override release mechanism of FIG. 3, shown partly cut-away and sectioned.
Figure 5:
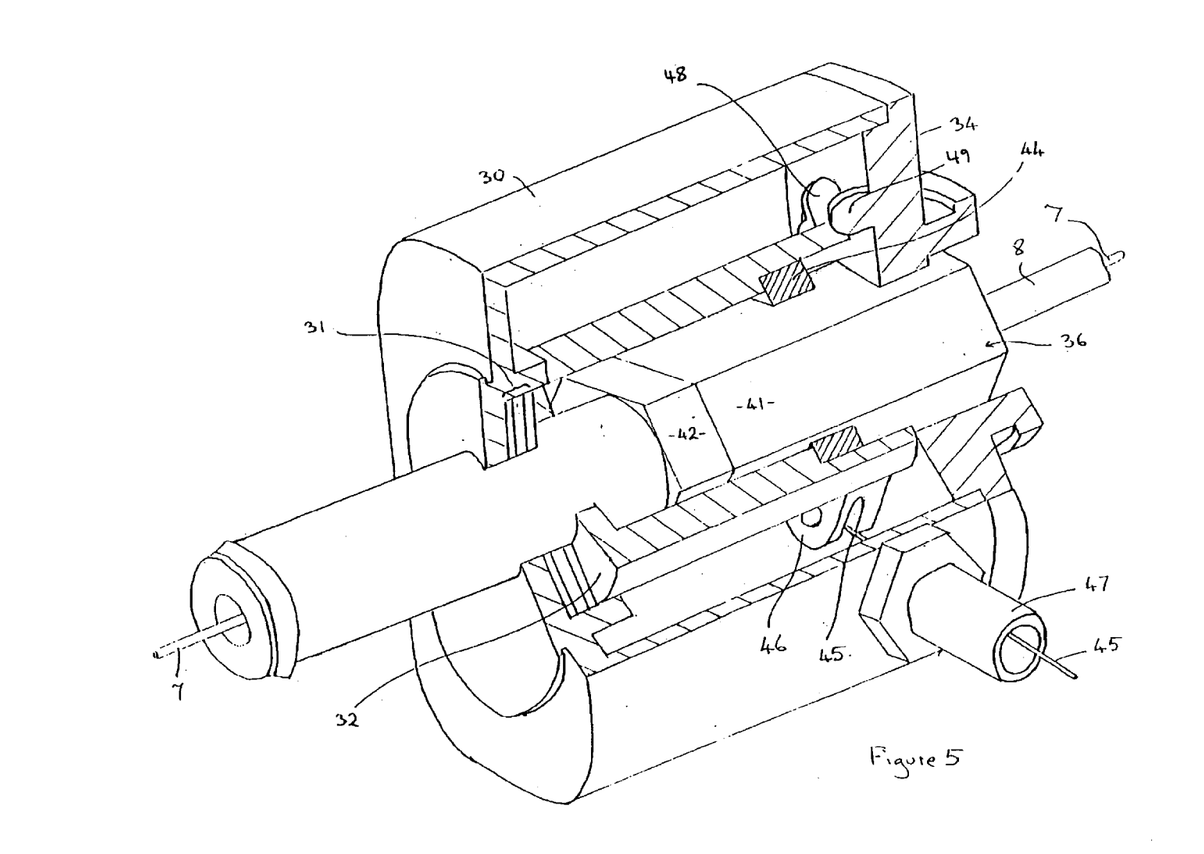
FIG. 5 is a perspective view similar to that of FIG. 4 but with the components in their relative positions and orientations after override brake release operation.

FIGS. 3 to 5 illustrate an override release mechanism according to the invention for use in conjunction with the electrically actuated cable brake mechanism of FIGS. 1 and 2. The mechanism of FIGS. 3 to 5 is designed as an add-on for mounting at the distal end of the housing 4 of the electrically actuated cable brake mechanism of FIGS. 1 and 2, but clearly exactly the same constructional principles could be used to manufacture a release mechanism according to the invention which is made integrally with the electrically actuated cable brake mechanism itself.

The components of the override release mechanism are illustrated in FIG. 3, and comprise a housing 30, a thrust-bearing assembly 31 comprising two thrust bearing plates separated by a bearing, a sleeve 32 within the housing having an abutment face 33, an end cap 34 for the housing, a rubber boot 35 and a hollow abutment member 36.

The assembly of the above components is illustrated in FIG. 4, which also shows the brake cable 7 and outer conduit 8 extending from the electrically actuated cable brake mechanism of FIG. 1. The illustration of FIG. 4 is in the reverse orientation to that of FIGS. 1 to 3, so that it is the left-hand side of the housing 30 as illustrated in FIG. 4 which abuts against the distal end of the housing 4 of FIGS. 1 and 2. The cable 7 runs freely through the hollow abutment member 36 of FIG. 4 and continues on to the vehicle brakes via a known reaction system. The outer cable 8 is joined securely to the abutment member 36 which comprises a cylindrical portion 40 and a portion of hexagonal section 41. The abutment member 36 is injection molded from a plastics material that is compression-resistant, with a hard bearing face 42, also of the same hexagonal section, between the cylindrical and hexagonal portions.

The sleeve 32 within the housing is also injection molded from a compression-resistant plastics material, and comprises a hollow cylindrical body portion 43 with a hard bearing face 44 which provides the abutment face 33. The face 44 is formed with a female hexagonal opening of precisely the size and shape of the hexagonal hard bearing face 42 of the hollow abutment member 36. When the two hexagons are out of alignment as shown in FIG. 4, then the six triangular shoulders of the bearing face 42 bear on the six flats of the hexagon of the bearing face 44, and prevent the hollow abutment member 36 from sliding in the sleeve 32 of the housing 30. If the sleeve 32 is moved through 30 degrees, then the two hexagons are brought into alignment and the hollow abutment member can pass down the sleeve to the position shown in FIG. 5.

To effect the angular rotation of the sleeve 32, there is provided a cable linkage 45 connected to an outer lug 46 of the sleeve 32 and passing out through a guide 47 in the wall of the housing 30. When the cable 45 is pulled, the sleeve 32 rotates. The hollow abutment member 36 is held against rotation be cooperation between its hexagonal portion 41 and a cooperating hexagonal opening in the housing (shown at the right hand end of the housing in FIGS. 4 and 5). In FIG. 5, the outer lug is shown, having come into view due to the pulling of the cable 45.

Figure 6:
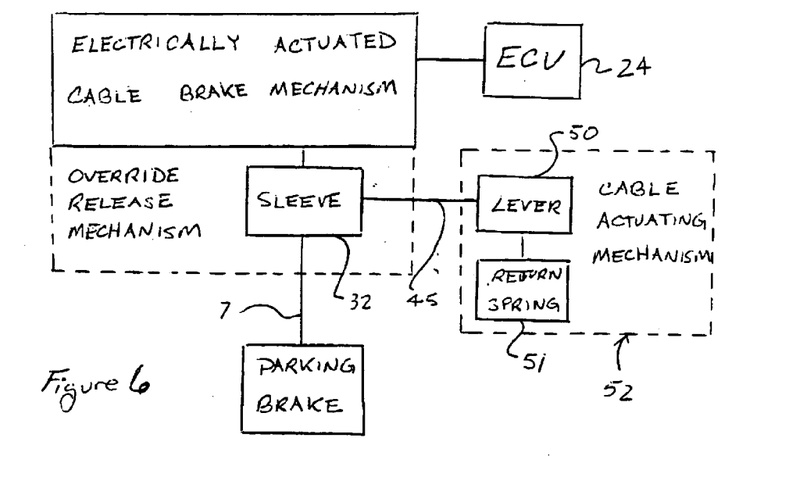
FIG. 6 is a block diagram of the cable brake mechanism of FIGS. 1 and 2 utilizing the override release mechanism of FIGS. 3 to 5.

A return spring 51 (FIG. 6) is provided for biasing the sleeve 32 back to the position shown in FIG. 4. In that position, stop members 48 and 49 on the sleeve 32 and housing end plate 34 respectively define the limit of rotation with a 30 degree offset between the hexagonal form of the hollow abutment member 36 and the hexagonal hole in the abutment face 33.

Figure 7:
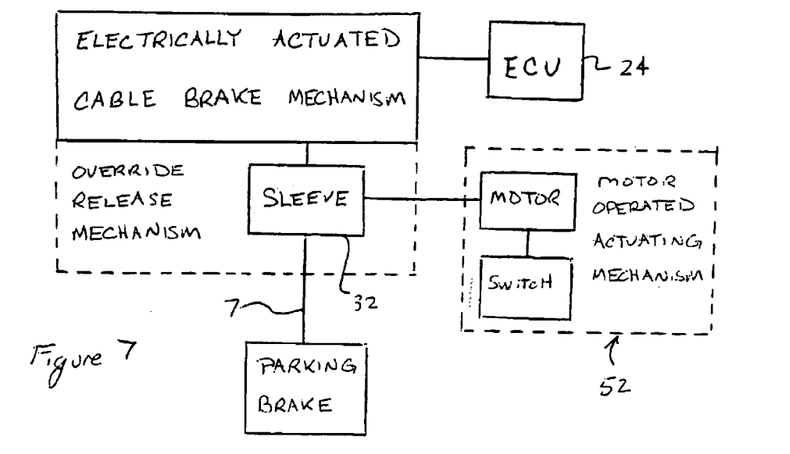
FIG. 7 is a block diagram similar to FIG. 6 but showing an alternative embodiment of means for selectively moving a stop member of the override release mechanism.

The actuator or means 52 for moving the sleeve 32 out of engagement with the shoulder of the abutment member 36 may be the lever or cable actuating mechanism (shown in FIGS. 4 to 6) or a two-way electric motor actuating mechanism (shown in FIG. 7). If the cable actuating mechanism is used, then it should act against the bias of the return spring 51 so that after the jammed or faulty cable tensioning mechanism has been repaired, the override release mechanism automatically resets as soon as the abutment member 36 is moved past the sleeve 32 into a fully-brake-released condition.

If the mechanism of FIGS. 1 and 2 seizes with the vehicle brakes locked in their fully braked condition, then the override mechanism of FIGS. 3 to 5 may be deployed. The cable 45 is pulled, preferably using a lever 50 which adds a considerable mechanical advantage to the tension applied to the cable 45. The lever 50 should be within reach of the driver of the vehicle so that if the vehicle is on a slope it can be controlled using the driving brake pedal. Tensioning of the cable 45 causes the rotation of the sleeve 32 through 30 degrees until the hexagonal portion of the hollow abutment member 36 slides through the hexagonal hole in the reaction face 33. The abutment member 36 then moves in the direction of the tensioning drive nut 5 of the cable brake mechanism, and with the reaction force in the outer conduit relieved, the tension in the brake cable 7 is reduced, releasing the vehicle brakes. Preferably actuation of the override brake release mechanism causes a visual and/or aural warning to be generated in the driver's cabin, advising that at that stage the vehicle is without a parking brake facility and should be driven or towed immediately to a repairer.

After the repair, when the seized brake actuation mechanism has been freed, it is necessary simply to cause the 24 to run the tensioning drive nut completely down the lead screw in the direction of brake release. Preferably the nut 5 contacts the end of the hollow abutment member 36 and pushes it back to the axial position shown in FIG. 4, when the spring bias member 51 rotates the sleeve 32 back to the position shown in FIG. 4 when the stop members 48 and 49 again contact one another.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. An override mechanism for a cable tensioning mechanism in which a cable is tensioned by a motor against the reaction thrust of a flexible outer conduit for the cable, the release mechanism comprising:

a hollow abutment member fastened to one end of the flexible outer conduit of the cable, the cable passing through the hollow center of the abutment member for connection to a motor-actuated tensioning drive nut;

a housing in which the abutment member can slide axially;

a stop member associated with the housing for engaging with a shoulder on the abutment member for arresting sliding movement of the abutment member in the housing and establishing a reaction surface against which the abutment member and the outer conduit bear when the cable is tensioned; and means for selectively moving the stop member so that the stop member is out of engagement with the shoulder of the abutment member to permit axial movement of the abutment member in the housing when it is desired to release the tension in the cable.

2. The override mechanism according to claim 1, wherein the movement to take the stop member out of engagement with the shoulder of the abutment is a rotary sliding movement of the stop member.

3. The override mechanism according to claim 2, wherein the abutment member comprises at least a portion which is non-cylindrical in shape, the shoulder on the abutment member being defined by an axial end of the non-cylindrical portion, the stop member comprising a sleeve within the housing having a non-cylindrical channel therein of a size and shape complementary to the size and shape of the non-cylindrical portion of the abutment member, and the means for selectively moving the stop member comprises means for rotating the stop member from an angular condition in which the shapes of the non-cylindrical portion of the abutment member and the non-cylindrical channel are out of alignment and the abutment member is thus prevented from entering the channel, to an angular condition in which the shapes are in alignment and the abutment member can enter the channel to relieve tension in the cable.

4. The override mechanism according to claim 3, wherein the abutment member further comprises a cylindrical guide portion of a diameter less than the maximum width of the non-cylindrical portion of the abutment member, and the shoulder on the abutment member is defined by a junction between the non-cylindrical portion and the cylindrical guide portion of the abutment member.

5. The override mechanism according to claim 3, wherein the housing comprises a guide portion cooperating with the non-cylindrical portion of the abutment member to prevent angular rotation thereof.

6. The override mechanism according to claim 3, wherein the non-cylindrical portion of the abutment member is hexagonal in shape.

7. The override mechanism according to claim 1, wherein the means for selectively moving the stop member out of engagement with the shoulder of the abutment member comprises a cable actuating mechanism acting to move the stop member against the bias of a return spring.

8. The override mechanism according to claim 1, wherein the means for selectively moving the stop member out of engagement with the shoulder of the abutment member comprises a motor-operated actuating mechanism.

9. The override mechanism according to claim 1, wherein the stop member is movable relative to the housing by the moving means.

10. An override mechanism for a cable tensioning mechanism in which a cable is tensioned by a motor against the reaction thrust of a flexible outer conduit for the cable, the release mechanism comprising:

an abutment member fastened to one end of the flexible outer conduit of the cable, the cable passing through the abutment member for connection to a motor-actuated tensioning drive nut;

a housing in which the abutment member can move;

a stop member associated with the housing for engaging the abutment member to arrest movement of the abutment member in the housing and establish a reaction surface against which the abutment member and the outer conduit bear when the cable is tensioned; and an actuator operably connected to the stop member to selectively move the stop member between a first position wherein the stop member is in engagement with the abutment member to arrest movement of the abutment in the housing and establish the reaction surface and a second position wherein the stop member is out of engagement with the abutment member to permit movement of the abutment member in the housing and release the tension in the cable.

11. The override mechanism according to claim 10, wherein the stop member moves between the first and second positions with rotary sliding movement.

12. The override mechanism according to claim 11, wherein the abutment member comprises at least a portion which is non-cylindrical in shape and a shoulder defined by an axial end of the non-cylindrical portion, the stop member comprises a sleeve within the housing having a non-cylindrical channel therein of a size and shape complementary to the size and shape of the non-cylindrical portion of the abutment member, and the actuator rotates the stop member between an angular condition in which the non-cylindrical portion of the abutment member and the non-cylindrical channel are out of alignment preventing the abutment member from entering the channel and an angular condition in which the non-cylindrical portion of the abutment member and the non-cylindrical channel are in alignment allowing the abutment member to enter the channel and relieve tension in the cable.

13. The override mechanism according to claim 12, wherein the abutment member further comprises a cylindrical guide portion of a diameter less than the maximum width of the non-cylindrical portion of the abutment member, and the shoulder on the abutment member is defined by a junction between the non-cylindrical portion and the cylindrical guide portion of the abutment member.

14. The override mechanism according to claim 12, wherein the housing comprises a guide portion cooperating with the non-cylindrical portion of the abutment member to prevent angular rotation thereof.

15. The override mechanism according to claim 12, wherein the non-cylindrical portion of the abutment member is hexagonal in shape.

16. The override mechanism according to claim 10, wherein the actuator comprises a cable actuating mechanism acting to move the stop member against the bias of a return spring.

17. The override mechanism according to claim 10, wherein the actuator comprises a motor-operated actuating mechanism.

* * * * *